United States Patent

[11] 3,633,485

[72] Inventor: Kenji Hiruma, Tokyo, Japan
[21] Appl. No.: 801,379
[22] Filed: Feb. 24, 1969
[45] Patented: Jan. 11, 1972
[73] Assignee: Kabushiki Kaisha Ricoh, Tokyo, Japan
[32] Priority: Feb. 29, 1968
[33] Japan
[31] 43/13074

[54] SHUTTER FOR USE IN A CAMERA
6 Claims, 1 Drawing Fig.

[52] U.S. Cl. .................................................. 95/60
[51] Int. Cl. .................................................. G03b 9/26
[50] Field of Search ........................................ 95/59, 60, 62

[56] References Cited
UNITED STATES PATENTS

| | | | |
|---|---|---|---|
| 2,621,570 | 12/1952 | Kesel et al. | 95/60 |
| 2,940,374 | 6/1960 | Fuerst | 95/60 |
| 3,208,365 | 9/1965 | Cooper et al. | 95/60 |
| 3,334,563 | 8/1967 | Kider et al. | 95/60 |
| 3,430,547 | 3/1969 | Norton | 95/60 |

FOREIGN PATENTS

| 1,264,247 | 3/1968 | Germany | 95/60 |
|---|---|---|---|

Primary Examiner—Samuel S. Matthews
Assistant Examiner—Michael Harris
Attorney—Burgess, Ryan and Hicks ABSTRACT: A shutter for a camera having a driving blade for driving a driver blade mounted on a common pivot. The blades are partially overlapped when closing the camera aperture in a first position determined by abutting projecting portions on the blades. The blades rotate simultaneously in completely overlapped condition to a second position thereby opening the aperture, and stop means is provided to determine the second position.

PATENTED JAN 11 1972
3,633,485
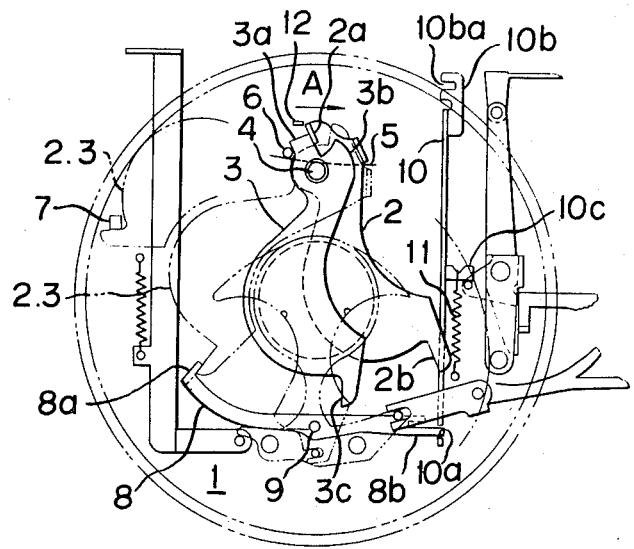
INVENTOR
KENJI HIRUMA
BY Burgess, Ryan & Hicks
ATTORNEYS

SHUTTER FOR USE IN A CAMERA

BACKGROUND OF THE INVENTION

The present invention relates to a shutter for use in a camera and more particularly a shutter of the blade-overlapping type which has a plurality of shutter blades which are adapted to overlap one upon the other at the end of the rotation through a predetermined angle and to overlap partially one upon the other at their initial positions.

Known is a shutter mechanism in which a single shutter blade is reciprocated so as to open or close the light path through a taking lens. In such shutter mechanism, the stroke of the reciprocation movement of the shutter blade must be sufficient enough to permit the maximum aperture of a wide aperture lens. Consequently the dimensions of such shutter mechanism are considerably large. Furthermore, the rotational speed of the shutter blade is limited because of the strength of the shutter components so that such shutter mechanism can not provide high shutter speeds and can not be applied to a wide-aperture lens. Thus, the shutter mechanism of the type described has been limited to the application to a small aperture lens with low shutter speeds of an inexpensive camera simple in construction.

In view of the above, the primary object of the present invention is to provide a reciprocating-type shutter which can be applied even to a wide aperture lens.

SUMMARY OF THE INVENTION

In brief, the present invention uses one driving shutter blade and one or a plurality of driven shutter blades. Upon release of the shutter, the driving blade is caused to rotate by a suitable driving means, thereby causing the successive rotations of the driven blades. When these blades rotate through a predetermined angle, they are completely overlapped one upon the other so that the lens is wide opened. When the blades are returned to their initial positions, they are partially overlapped one upon the other sufficient enough to close the lens aperture.

According to one preferred embodiment of the present invention, the control of the exposure time, that is the shutter speeds, can be effected by the adjustment of the maximum angle of rotation of the blades. This adjustment of the angle of rotation can be adjusted by a lever adapted to engage with the blades so as to stop them.

According to still another embodiment of the present invention, the exposure time, that is the shutter speeds may be automatically changed when a flash cube is attached to the camera.

The present invention will become more apparent from the following description of a preferred embodiment thereof taken in conjunction with the accompanying drawing.

BRIEF DESCRIPTION OF DRAWING

The single FIGURE is a plan view of essential parts of a shutter for camera according to the present invention.

DESCRIPTION OF THE PREFERRED EMBODIMENT

To a shutter baseplate 1 is pivoted one end each of a driving shutter blade 2 (referred to as "drive blade" hereinafter) and of a follower or driven shutter blade 3 (hereinafter referred to as "driven blade") for rotary movement. A spring 5 is attached to a driving blade 2 so as to impart the tendency for driving blade 2 to rotate in the counterclockwise direction of the figure. At a portion adjacent to the pivoted position of the driving blade 2 is provided a bent portion 2a while at the free end of the drive blade 2 is provided a projection 2b. At a portion adjacent to the pivoted position of the driven blade 3 are provided projections 3a and 3b while at the free end of the driven blade 3 is provided another projection 3c. Except for portions adjacent to the pivoted portions of the drive and driven blades 2 and 3, they have substantially similar configurations. It should be noted here that in the description the term "front" or "back" means front side or back side in the direction of movement of blades respectively when the shutter is in the open position as shown by chain lines and moved to the closed position as shown in full lines in the drawing. A pin 6 fixed to the base plate 1 serves as a stop for the driven blade 3. That is, when the shutter is closed, the back side edge of the projection 3a of the driven blade 3 engages with the pin 6 while the back face of the bent portion 2a of the drive blade 2 presses against the front side edge of the projection 3a. When upon rotation of the driving blade 2, the front surface of the bent portion 2a thereof engages with the back side edge of the projection 3b of the driven blade 3, the portions of the drive blade 2 and driven blade 3 except the portions thereof adjacent to the pivoted portion thereof are adapted to overlap one upon the other. Another stop pin 7 is fixed to the base plate 1 at such a position that the projections 2b and 3c of the driving and driven blades 2 and 3 engages with the pin 7, whereby the drive and driven blades are stopped at their maximum swing angle, that is maximum rotational position. An engaging lever 8 is rotatably pivoted to the base plate 1 by means of a pivot 9. A bent portion 8a is formed at one end of the engaging lever 8 while the other end 8b thereof is loosely fitted into a slot 10a formed in the lower end portion of a flash-sync lever 10 which is disposed slidably in parallel with the surface of the base plate 1. A bent portion 10b is formed at the upper end of the flash sync lever 10 while an intermediate projection 10c is formed intermediate thereof. A slot 10ba is formed in the upper end other portion of the upper bent portion 10b for engagement with a flash member of a device not shown so that when a flash cube (not shown) is attached upon the camera, this member causes the flash-sync lever 10 to rise upwardly by a predetermined distance. Between the intermediate projection 10c and the base plate 1 is loaded another spring 11 so that the flash-sync lever 10 is normally biased downwardly in the figure. Normally, the bent portion 8a of the engaging lever 8 is extended into the paths of travel of the projections 2b and 3c of the driving and driven blades 2 and 3. However, when the flash cube is attached to the camera, the bent portion 8a is retracted out of the paths of the projections 2b and 3c. When the bent portion 8a extends into the above-described paths, both of the driving and driven blades engage their projections 2b and 3c with a front surface of the bent portion 8a between the completely shutter-closed position and the wide-opened position.

A drive lever 12 is adapted to engage with the bent portion 2a of the driving blade 2 upon release of the shutter. This lever 12 is adapted to move in the direction indicated by the arrow A by means of a suitable member not shown. Upon movement of this driving lever 12, the driving blade 2 is rotated so that the front surface of the bent portion 2a of the driving blade 2 engages with the back side edge of the projection 3b of the driven blade 3 which is caused to rotate due to the frictional engagement with the driving blade 2. Therefore, the blades 2 and 3 overlap upon one another and in this state both of the blades are rotated in the clockwise direction until the projections 2b and 3c of the blades 2 and 3 engage with the bent portion 8a of the engaging lever 8. Thereafter by the force of the spring 5, the driving and the driven blades 2 and 3 in the overlapped state are rotated in the counterclockwise direction so that the back side edge of the projection 3a engages with the pin 6, thereby stopping the driven blade at the shutter-closed position. The driving blade 2 is further rotated so that the back face of the bent portion 2a thereof engages with the front side edge of the projection 3a of the driven blade 3, thereby pressing against the projection 3a so as to hold the driven blade 3 stationary in shutter-closed position while holding the driving blade 2 itself in also the shutter-closed position.

When the flash cube is attached to the camera for flash photography, the bent portion 8a, that is the engaging end of the engaging lever 8 is retracted from the paths of the driving and driven blades so that the superposed driving and driven blades 2 and 3 are permitted to rotate until the projection 2b of the driving blade 2 engages with the stop pin 7. From this position, both of the blades 2 and 3 are returned to their shutter-closed positions in the similar manner as described above.

The angles of rotation of the driving and driven blades 2 and 3 until the projections 2b and 3c thereof engage with the stop pin 7 are larger than those when the projections engage with the bent portion 8a. In the former case, the shutter speeds are slow, for example, one-thirtieth to one-fiftieth sec. while in the latter case, the shutter speeds are high, for example, one-eightieth to one-one hundred twenty-fifth sec.

According to the present invention, two shutter blades are overlapped one upon the other when rotated so that the angle or rotation both at high and low shutter speeds is far less as compared with the shutter employing only one shutter blade. Therefore, when the shutter of the present invention is applied to a wide-aperture lens, the dimensions of the shutter can be sufficiently reduced. Moreover, the use of the two shutter blades of the invention when overlapped in the shutter open position minimizes the space required as compared to the use of a single large shutter blade. When a plurality of driven blades are provided for one driving blade, the advantages of the present invention as described above will be much improved. Also it is possible to provide a plurality of engaging levers instead of one as in the above embodiment and in such a manner the engaging end of a selected one of the plurality of engaging levers is extended in the paths of the shutter blades, thereby providing a plurality of shutter speeds. The bent portion 2a of the driving blade 2, that is the driving portion of the blade 2 for driving the driven blade is not necessarily required to be provided at the portion adjacent to the pivoted position of the blade 2. The bent portion 2a may be formed at any suitable position along the back side edge of the driving blade or formed as a part of the back side edge of the projection 2b. In this case, a pin adapted to stop the driving blade 2 at shutter-closed position and a spring is provided so as to impart to the driven blade a tendency to normally rotate in the counterclockwise direction.

According to the present invention, there are provided a plurality of shutter blades which are rotated in the same direction upon release of the shutter and which are overlapped one upon the other at least at the end of their rotation through a predetermined angle. Therefore, the shutter of the present invention is simple in construction and eliminate the defects of the conventional shutter of the type described. The shutter of the present invention is compact in size even when applied to a wide-aperture lens providing accurate exposure speeds. If required, shutter speeds over a wide range may be provided by the shutter of the prevent invention.

So far the present invention has been described with particular reference to the preferred embodiment thereof, but it will be understood that the variations and modifications can be effected without departing the true spirit of the present invention as described hereinafter and as defined in the appended claims.

I claim:

1. In combination with a camera shutter means comprising a driving blade mounted on a pivot for rotation past an aperture in the camera;
at least one driven blade mounted to rotate on said pivot;
said driving and driven blades positionable in a first position covering the aperture and being partially overlapped with respect to each other;
said driving and driven blades simultaneously rotatable to a second position uncovering said aperture and being completely overlapped during said simultaneous rotation and in said second position;
said driving and driven blades having substantially the same shape throughout most of their configuration;
said driving blade in the area adjacent to its pivot having an extending portion;
said driven blade in the area adjacent its pivot having a pair of projecting areas angularly located with respect to each other;
said extending portion of said driving blade adapted to contact one of said projecting areas of said driven blade when said blades are in the first position; and
said extending portion adapted to contact said other projecting area as said driving blade moves from the first to the second position whereby said driving blade drives said driven blade to the second position in the overlapped condition.

2. The combination according to claim 1 in which a single driven blade is provided, said pair of projecting areas include respective individual surfaces that intersect each other, said extending portion comprises a bent part that contacts one of said surfaces in the partially overlapped condition of the first position of said blades and is rotatable to contact the other surface for the simultaneous rotation of said blades.

3. The combination according to claim 1 in which a pin is mounted on the camera against which one projecting area abuts to determine the first position of said driven blade.

4. The combination according to claim 1 in which a stop means is provided in said camera remote from the pivot against which said overlapping blades abut to determine the second position.

5. The combination according to claim 4 in which said stop means comprises a stop pin determining the second position of said blades after rotation through a predetermined angle, and said stop means includes a separate projection that is selectively positionable to allow abutment of said blades thereagainst whereby the second position is thereupon determined by an angular movement less than said predetermined angle.

6. The combination according to claim 5 in which each said blade includes an extending part located remote from the pivot, said extending parts adapted to simultaneously abut said stop means to determine the second position.

* * * * *